United States Patent [19]
Mueller et al.

[11] 3,963,333
[45] June 15, 1976

[54] CAMERA CONTROL SYSTEM

[75] Inventors: Arthur C. Mueller, Niles; Erwin E. Figge, Des Plaines, both of Ill.

[73] Assignee: Polaroid Corporation, Cambridge, Mass.

[22] Filed: Feb. 25, 1974

[21] Appl. No.: 445,469

Related U.S. Application Data

[63] Continuation of Ser. No. 371,817, June 20, 1973, abandoned.

[52] U.S. Cl. .............................. 352/72; 352/78 C; 352/141
[51] Int. Cl.² ...................................... G03B 23/02
[58] Field of Search .................. 352/72, 78 C, 141; 354/21

[56] References Cited
UNITED STATES PATENTS

| | | | |
|---|---|---|---|
| 2,186,611 | 1/1940 | Martin | 352/141 X |
| 3,176,599 | 4/1965 | Anwyl | 354/21 |
| 3,312,158 | 4/1967 | MacMillin | 354/21 X |
| 3,505,937 | 4/1970 | Albedyll | 352/141 X |
| 3,604,327 | 9/1971 | Hirata | 352/141 X |
| 3,626,829 | 12/1971 | Iida | 352/72 |
| 3,667,363 | 6/1972 | Tanaka | 354/21 |

*Primary Examiner*—Monroe H. Hayes
*Attorney, Agent, or Firm*—David R. Thornton

[57] ABSTRACT

A control system for a cassette-load movie camera having an automatic exposure control system. A variable neutral density filter adjusts the exposure control system to the film sensitivity, and a sensitivity range control adjusts the exposure control system alternatively for a range of high film sensitivities or a range of low film sensitivities. Cassette indicia automatically effect a filter setting and sensitivity range setting upon placement of the cassette within the camera. A switching system controls energization of the exposure control system in relation to energization of the camera drive motor.

11 Claims, 7 Drawing Figures

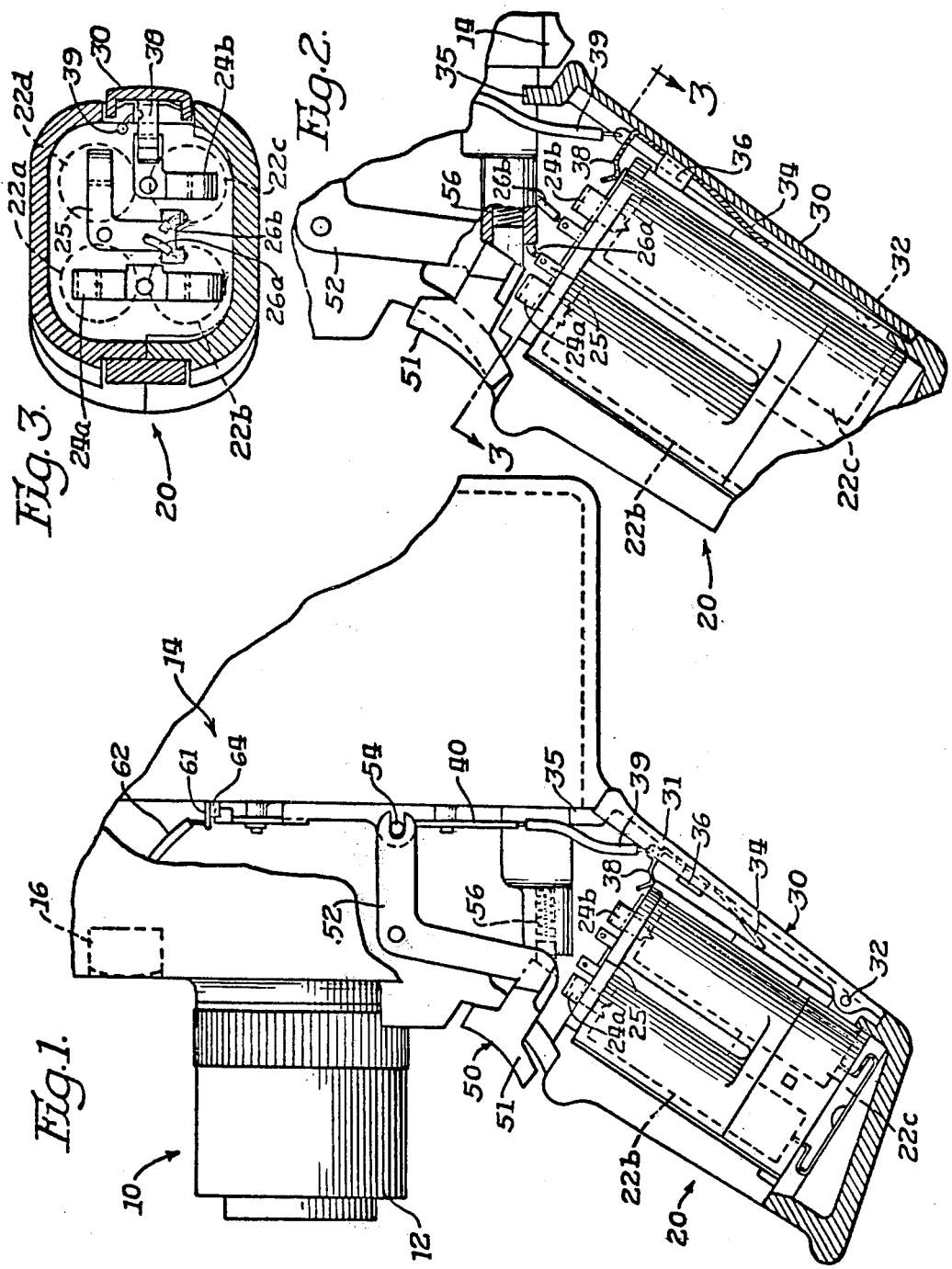

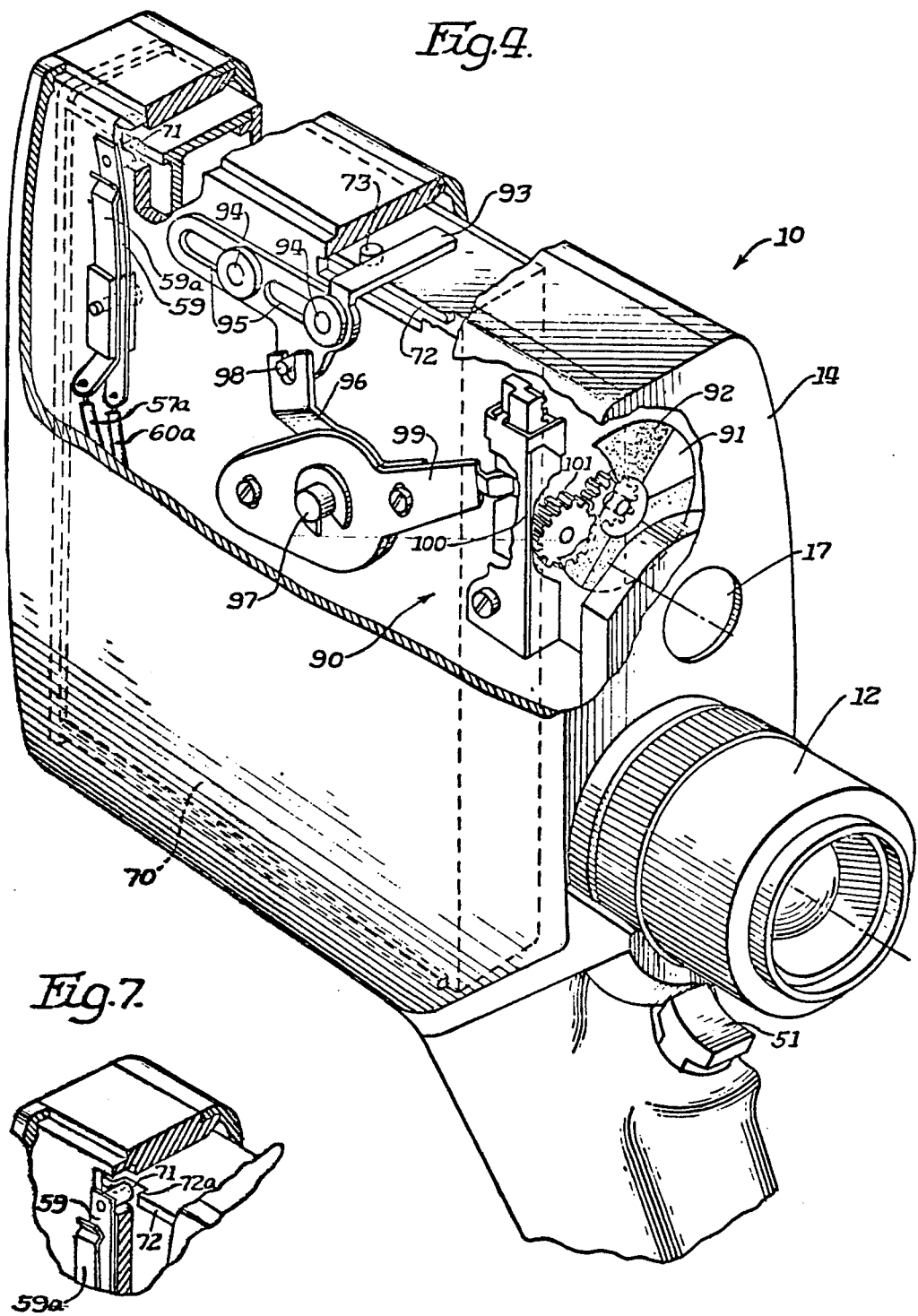

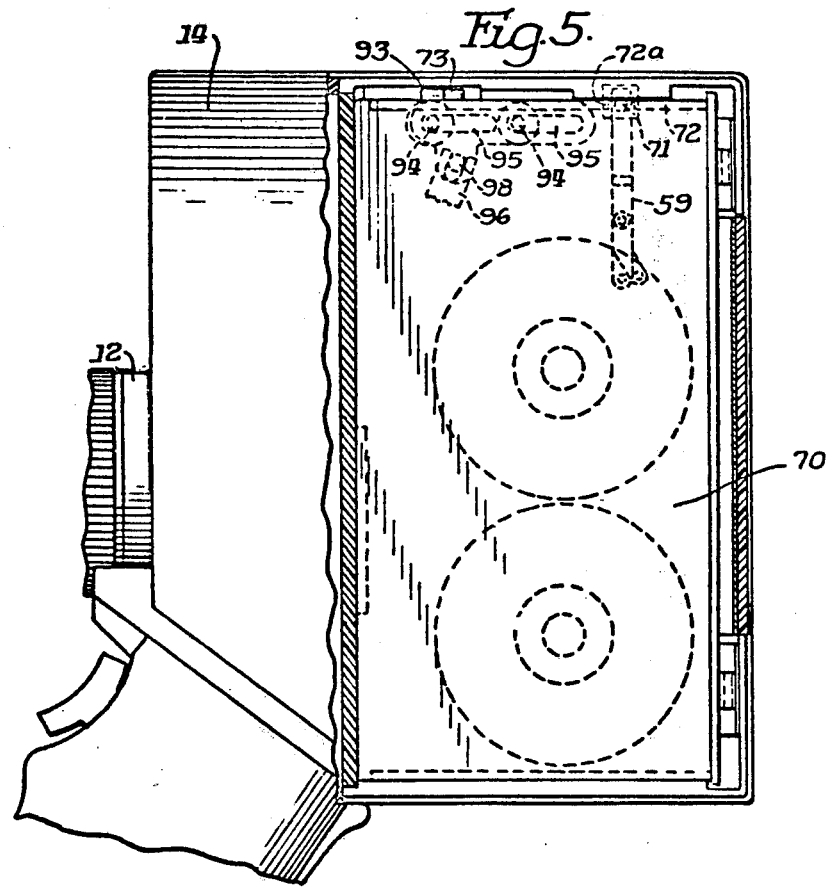
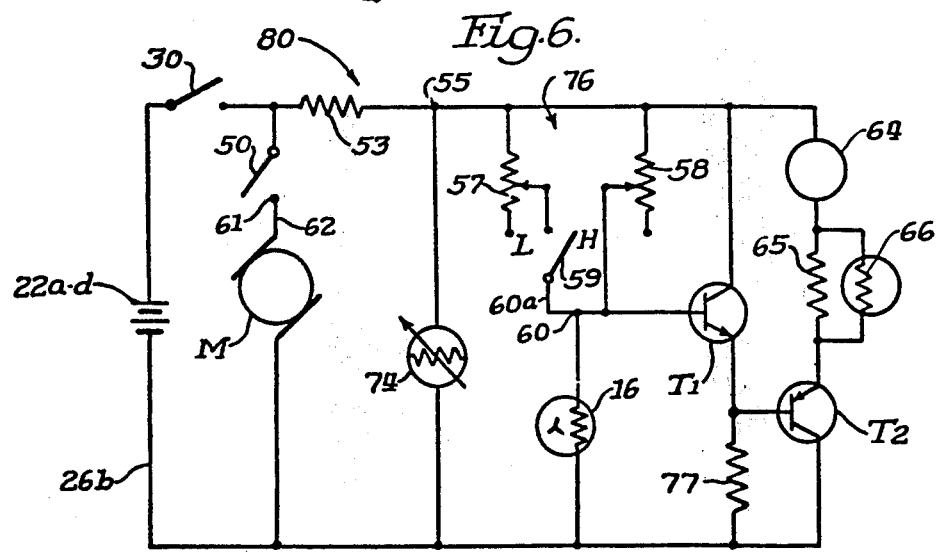

CAMERA CONTROL SYSTEM

CROSS-REFERENCE TO PENDING APPLICATION

This application is a streamlined continuation of an original application by Arthur C. Mueller and Erwin E. Figge entitled CAMERA CONTROL SYSTEM, Ser. No. 371,817, filed on June 20, 1973, now abandoned.

BACKGROUND AND GENERAL DESCRIPTION

This invention relates generally to camera systems and more particularly to a control system for a cassette-load camera.

There is strong demand in the amateur photography field for camera systems which simplify the task of the operator. Two prime objectives are to free the photographer from unnecessary film handling and from the need to manually adjust the camera exposure setting to the sensitivity of the particular film being used and to the particular light conditions encountered.

The desire to simplify the task of the photographer has led to the development and use of camera systems in which the film is contained within a protective cartridge or cassette, and the camera is specifically adapted to receive the film cassette with a minimum of handling of the film. To enhance simplicity of use, current cassette or cartridge load camera systems also frequently include some form of fully-automatic exposure control system and indicia on the cartridge for automatically adjusting the camera exposure control system to the ASA rating of the film. However, difficulties have been encountered in providing in such a camera a sensitive fully-automatic exposure control system capable of adjustment to a broad range and large number of film sensitivities. The provision of such a broad range film sensitivity adjustment capability has usually required a film sensitivity selector which must be manually set by the photographer and the provision of some form of exposure control on/off switch which must be consciously switched on when the camera is being used and consciously switched off to minimize battery drain by the exposure control system when the camera is not being used. It is the principal object of the present invention to provide a control system for a cassette-load camera which overcomes these difficulties.

Briefly described, the present invention provides a cassette-load camera control system for adjusting the exposure control system of the camera to the sensitivity of the film contained in the cassette comprising variable neutral density filter means positioned in optical alignment with the exposure control system light sensing photocell for selectively altering the quantity of light incident upon the photocell, filter setting means responsive to indicia provided on the film cassette to effect a particular neutral density setting for the variable density filter means related to the sensitivity of the film in the film cassette, sensitivity range control means for adjusting the camera exposure control system alternatively for a range of high film sensitivities or a range of low film sensitivities, and range setting means responsive to other indicia provided on the film cassette to effect setting of the range control means to either the high film-sensitivity range or the low film-sensitivity range as related to the sensitivity of the film contained in the film cassette. The filter setting means aand the range setting means are correlated to effect adjustment of the camera exposure control system to the particular sensitivity of the film contained in the film cassette.

The range switching means preferably comprises a resistance network for establishing a reference level for the photocell and switch means responsive to the range setting means for switching said resistance network alternatively between a first reference level setting for a high film-sensitivity range and a second reference level for a low film-sensitivity range.

To achieve requisite level of sensitivity, the camera exposure control system preferably employs a photoresistive-type photocell which requires a source of electrical energy for operation. In a cassette-load movie camera, a common source of electrical power is provided to provide energy for both the exposure control system and the film and shutter drive motor. To control energization of the exposure control system relative to energization of the motor drive system in such a camera, the control system of the present invention further comprises a camera control grip including a master control switch means normally biased to an open condition and adapted in closed condition to collect the camera exposure control system to the power source and a motor control switch means normally biased to an open condition and adapted in closed condition to connect the power source to the drive motor. The master control switch means and the motor control switch means are arranged so that normal manual grasping of the grip closes the master control switch means before the motor control switch means can be closed so that the exposure control system is energized before energization of the drive motor. An electrical circuit is arranged to connect the power source to the drive motor and the exposure control system and is effective to render the motor control switch inoperative to energize the drive motor until the master control switch means is closed.

EXEMPLARY EMBODIMENT

Further objects and features of the present invention will become apparent from the following description of an exemplary embodiment, taken in conjunction with the accompanying drawings. In these drawings:

FIG. 1 is an elevational view, in partial section, of the grip portion of the control system embodied in a camera in accordance with the present invention;

FIG. 2 is an enlarged, partial sectional view of the grip portion of the control system in a different mode;

FIG. 3 is a cross-sectional view taken at line 3—3 in FIG. 2;

FIG. 4 is an enlarged perspective view of the exposure control sensitivity adjustment portion of the control system of the present invention;

FIG. 5 is an enlarged, broken-away elevational view to further illustrate the filter and sensitivity range sensing means of the control system;

FIG. 6 is a schematic diagram of the camera electrical circuitry as improved in accordance with this invention; and FIG. 7 is a removed partial sectional view of a portion of the exposure control sensitivity adjustment system shown in a different mode of operation than the mode illustrated in FIG. 4.

Referring generally to the drawings, a cassette-load movie camera embodying the control system of the present invention is generally indicated by the reference numeral 10. The camera 10 includes a lens and focusing system 12 and a camera body 14 adapted in the usual manner to feed a roll of movie film past an exposure aperture. As seen in FIGS. 4 and 5, the camera body 14 is adapted to receive a film-containing cassette 70 of selected dimensions.

An electric drive motor M (FIG. 6) is positioned within the camera body 14 and adapted in the usual manner to drive film and a shutter at regulated speeds through a suitable means. The camera body 14 also incorporates an exposure control system including a photo-resistive photocell 16, as shown schematically in FIG. 6. As well-known by those skilled in the art, the photocell 16 is placed in a suitable position behind a lens 17 and is responsive to provide an electrical signal proportional to the quantity of light in the field of view of the camera. As explained in detail in copending application Ser. No. 246,757, filed on Apr. 24, 1972, by Arthur C. Mueller and entitled "Exposure Control System," issued on May 7, 1974 as U.S. Pat. No. 3,810,207, such a signal functions through a galvanometer motor to operate an iris system and thereby adjust the camera aperture setting to the quantity of light in the field of view of the camera.

A switching system in accordance with this invention is housed within a control grip 20. The grip 20 contains an electrical power source in a form of four dry cell batteries 22a–d. Conductors 24a and 24b connect the batteries 22a–d in series. A return conductor 25 connects return leads 26a and 26b to the negative side of the batteries. As shown schematically in FIG. 1, suitable contacts also are provided at the lower end of the grip 20 to complete the battery circuit.

The control grip 20 includes an elongate master control switch 30 including a switch lever 31 positioned along the rear of the grip. The switch lever 31 preferably extends along the entire length of the grip 20 and is pivoted to the grip 20 by pins 32. A leaf spring 34 biases the upper portion of the switch lever 31 outwardly to the rear of the grip 20. This construction for the master control switch 30 is such that the grip 20 cannot be conveniently held in a normal manner without the palm of the user engaging with and closing the switch contact 38. Accordingly, the master control switch 30 will be the first switch to be activated when the camera is picked up and prepared for use. A stop 36 is provided on the interior of the switch lever 31 to limit the inward swing of the switch lever 31 when the control grip 20 is held.

The master control switch contact 38 is dimensioned to project inwardly into the grip 20 a predetermined extent. As illustrated in FIG. 1, the contact 38 is arranged to be out of electrical contact with the battery conductor 24b when the spring 34 retains the switch lever 31 in its extreme outward or opened position. The outward movement of the switch lever 31 under the influence of the biasing spring 34 is limited by the engagement of a stop shoulder 35 on the upper end of the switch lever 31 with the camera body 14.

Movement of the switch lever 31 inwardly into a closed position, such as illustrated in FIG. 2, drives the contact 38 inwardly into contact with the battery conductor 24b within the grip 20. A lead wire 39 is connected to the contact 38 and extends upwardly into the camera body 14. The wire 39 is in electrical connection with a sliding shutter release lever 40 which, in turn, is electrically connected to the resistor 53 (FIG. 6). The lever 40 mechanically releases the camera shutter (not shown) for rotation when it is moved into a raised position. The return wire 26a completes the exposure control circuit. Hence, the closing of the master control switch 30 energizes the exposure control system to adjust the camera aperture setting to the intensity of light in the field of view. The location and configuration of the switch lever 31 assures that the exposure control system will be activated each time the camera 10 is picked up by the grip 20 before the picture-taking process begins. Likewise, the exposure control system will be deactivated, and any unnecessary drain on the batteries 22a–d eliminated whenever the camera is set down and the grip 20 released.

The control grip 20 also includes a motor switch 50. As seen in FIG. 1, the switch 50 includes a trigger 51 positioned on the front of the grip 20 and activated by the index finger of the camera user. A linkage mechanism 52 supports the trigger 51 on the camera body 14 and mechanically connects the trigger to the shutter lever 40 through a pin and slot connection 54. A compression spring 56 biases the linkage 52 and trigger 51 outwardly toward an opened position and simultaneously biases the shutter lever 40 downward. Operation of the trigger 51 to overcome the bias of the spring 56 will function to raise the shutter lever 40 and release the shutter for operation.

The camera body 14 carries an electrical contact 61 for controlling the operation of the film and shutter drive motor M. A lead 62 connects the contact 61 with the drive motor M through a suitable circuit as schematically shown in FIG. 6. The circuit to the batteries 22a–d is completed by the motor return lead 26b. As seen in FIG. 1, the contact 61 is normally held out of engagement with the conductive shutter lever 40 by a stop pin 64 or the like. The motor control circuit is thus normally broken and is at least partially completed when the trigger 51 is operated to raise the shutter lever 40 into electrical contact with the motor contact 61. Current will not flow through the motor lead 62, however, unless the master control switch 30 has been closed to connect the lever 40 to the batteries 22a–d.

The circuitry for controlling and energizing the motor M and the exposure control system is shown schematically in FIG. 6 in conjunction with the exposure control circuitry itself as a complete circuit 80. As seen in FIG. 6, power from the batteries 22a–d will energize the photocell 16 and the other components of the exposure control circuit as soon as the master switch 30 is closed. However, the motor M will not begin operation until both the switch 30 and the motor switch 50 are closed. Also, the closing of the motor switch 50 will not energize the motor M unless the master switch 30 is closed. The control system of this invention thereby permits easy, basically foolproof operation of the camera in a manner which assures an accurate exposure of the film and preserves the power of the batteries in the camera.

As further explained in said copending application of Arthur C. Mueller, Ser. No. 246,757, the photocell 16 is a photo-sensitive resistance photocell and forms part of an automatic iris blade exposure control system incorporated within the camera 10. The photocell 16 senses the quantity of light in the field of view of the camera 10 and cooperates with an exposure control circuit to create a resistivity change which is a function of the sensed light intensity. The exposure control circuit incorporates a galvanometer-type motor 64 which responds to the change in resistivity of the photocell 16 to move iris blade means and adjust the camera aperture setting to produce an optimum exposure condition for the camera 10.

The circuit 80 includes a drop resistor 53 in series with the battery 22a–d and a voltage-dependent resistor 74 in parallel with the battery 22a–d which provides a 6 volt output. The resistors 53 and 74 cooperate to supply a constant voltage signal to the junction 55. The resistor 53 is preferably 11 kilo-ohms, and the system operates to maintain the junction point 55 at a constant 1.2 volts.

The photocell 16 diminishes in electrical resistivity as the quantity of light incident thereon increases. In accordance with the invention, the photocell 16 is in series with a resistance network formed by variable resistors 57 and 58. The resistor 58 is connected in series with the photocell 16 across the voltage supply whereas the resistor 57 is adapted to be connected in parallel with the resistor 58 by a switch 59. The function of the resistors 57 and 58 and the switch 59 is to provide an ASA sensitivity range control system for the camera exposure control system. The resistor 58 is preferably approximately 500 kilo-ohms, the precise resistance level being set during production of the camera. When the switch 59 is open (in the high position H), the relatively high resistance R58 is in series with the photocell 16 thereby establishing a high resistance reference level to adjust the camera exposure control system for a high range of film sensitivities (e.g., ASA 80 to ASA 500). The resistor 57 is preferably approximately 50 kilo-ohms, the precise resistance level also being set during production of the camera. Accordingly, when the switch 59 is closed (in the low position L), the relatively low resistance R57 is placed in parallel with the high resistance R58 such that the total resistance in series with the photocell 16 is relatively low thereby establishing a low resistance reference level to adjust the camera exposure control system for a low range of film sensitivities. The particular ASA film setting for the exposure control system within the high or low range of film sensitivities is determined by the setting of the neutral density filter wheel 91 described hereinafter.

The NPN transistor T1 and the PNP transistor T2 are arranged as an emitter-follower current amplifier. A resistor 77 is provided in the emitter circuit of the NPN transistor T1 and applies a voltage at the base of the PNP transistor T2 which is a direct function of the voltage signal at the reference point 60. The PNP transistor T2 is coupled in series with a meter coil of a galvanometer drive motor 64 which drives the camera iris blade means. A temperature-compensating network comprising a resistor 65 and a thermistor 66 connected in parallel is provided to minimize the effect of temperature changes on the galvanometer-type motor coil. The exposure control circuitry operates so that the system tends to maintain the base of the first transistor T1 at the same balanced voltage. As explained in copending application Ser. No. 246,757, if the voltage at point 60 changes from the equilibrium voltage level due to a change in light level sensed by the photocell 16, the meter coil of motor 64 is deflected and changes the light aperture in front of the photocell 16 until the reference point 60 has returned to the equilibrium voltage. The circuit, by thus re-establishing the equilibrium or null point, determines the proper aperture setting.

It should be understood that the range control system 76 permits identical settings of the neutral density filter wheel 91 to be used in both the low range of film sensitivities (ASA 16 to ASA 80) and the high range of film sensitivities (ASA 80 to ASA 500), thereby effectively doubling the utility of the neutral density filter wheel 91.

The location and operation of the switch 59 incorporated in the film sensitivity range control system 76 are illustrated in FIGS. 4, 5 and 7. In the illustrated embodiment, the switch 59 is a leaf spring switch that is mounted in a selected position with respect to the cassette 70. A suitable lead 60a connects the switch 59 to the reference point 60 in the circuit 80 (FIG. 6). The low resistance contact 59a comprises a second leaf spring switch positioned adjacent the switch 59. A suitable lead 57a connects the contact 59a to the resistor 57. As seen in FIG. 6, the spring switch 59 is normally held out of engagement with the contact 59a so that the high resistance 58 is normally determinative in the circuit.

The control system also includes means for automatically moving the switch 59 between its high and low positions in response to the ASA rating of the film within the cassette 70. In this regard, the upper end of the switch 59 includes a projection 71 which extends through the adjacent wall of the camera body 14 into the chamber which receives the cassette 70. The cassette 70 is provided with indicia means which activates the switch 59 if the film within the cassette is in the low ASA range. The cassette indicia also retains the switch 59 in its open or deactivated condition when the film housed in the cassette 70 is in the high ASA range.

In the preferred arrangement as seen in FIGS. 4, 5 and 7, the switch projection 71 is positioned in a selected location at the upper portion of the camera body 14, and the top portion of the cassette 70 is provided with a flange 72. The flange 72 is designed to be in alignment with the switch projection 71 when the cassette 70 is positioned properly within the camera body 14.

In the illustrated embodiment, the cassette flange 72 comprises the indicia means for indicating the type of film in the cassette 70. As seen in FIG. 4, the flange 72 is dimensioned and located to depress the projection 71 and swing the spring switch 59 into engagement with the contact 59a when the film in the cassette 70 is in the low ASA range. As further seen in FIG. 7, the flange 72 alternatively is provided with a notch 72a which prevents the flange 72 from activating the switch 59 when the film in the cassette 70 is in the high ASA range. With the foregoing arrangement, the placement of the cassette 70 within the camera 10 operates through the film sensitivity range control system 76 to adjust the operation of the exposure control circuit 80 to the ASA range of the film within the cassette 70.

The camera 10 in accordance with this invention includes a filter system, generally indicated by the reference numeral 90 in FIG. 4. The filter system 90 is coordinated with the film sensitivity range control system 76 to adjust the exposure control circuit to compensate for the specific ASA speed of the film within the cassette 70 within either the high or low speed ranges.

The filter system includes the neutral density filter wheel 91 which is provided with a series of filter sectors 92 of varying density. The filter wheel 91 is optically aligned and positioned behind the photocell lens 17 and in front of the photocell 16. The filter wheel 91 operates to alter the quantity of light incident upon the photocell 16 as a function of the specific ASA rating of the film provided within the cassette 70. The camera exposure control system such as described and claimed in copending application Ser. No. 246,757 then operates to compensate for the amount of picture-taking limit available to impinge upon the film in the camera 10. For instance, if the ASA film rating is high within the selected range, less light is needed for proper exposure, so the iris aperture is reduced by placing a lighter filter sector 92 in alignment with the photocell 16. If the film is a low speed film within the selected range, the filter wheel 91 is rotated to place a darker filter sector 92 in front of the photocell 16 to increase the size of the camera iris aperture.

In accordance with this invention, the filter wheel 91 is automatically set in the proper position, within either the high or low ASA speed ranges, by the positioning of the cassette 70 within the camera 10. As seen in FIGS. 4 and 5, the top portion of the cassette 70 is provided with an abutment shoulder 73. The longitudinal positioning (left to right in FIG. 5) of the shoulder 73 on the cassette 70 is selected to be a function of the ASA rating of the film housed within the cassette. A slide bar member 93 is mounted on the camera body 14 to project into the cassette chamber and engage with the shoulder 73 as the cassette 70 is positioned within the camera 10.

Guide pins 94 engage within slots 95 provided on the guide bar member 91 and permit the member to translate longitudinally to sense the position of the shoulder 73.

The longitudinal movement of the slide bar member 93 in turn causes a crank arm 96 to pivot about a pivot pin 97 through a pin and slot connection 98. As seen in FIG. 4, a second crank arm 99 is joined to the arm 96 and is moved through a selected distance in response to the movement of the slide bar member 93. A gear rack 100 is connected to the second crank arm 99 and likewise is translated a selected distance in response to the movement of the slide bar member 93. A gear train 101 connects the rack 100 to the filter wheel 91 and operates to rotate the filter sectors 92 into a selected position in front of the photocell 16 in response to the movement of the rack 100.

The above described filter system 90 operates in the same manner to set the camera 10 to the specific ASA film rating in both the high or low range settings for the ASA range control system 76. Accordingly, the filter system 90 and range control system 76 cooperate to extend the ASA range of the camera 10 by permitting specific ASA settings within either the high or low range.

Although the invention has been described with a certain degree of particularity, it should be understood that the present disclosure has been made only by way of example. Consequently, numerous changes in the details of construction and in the combination and arrangement of components as well as in the possible modes of utilization will be apparent to those familiar with the art and may be resorted to without departing from the spirit and scope of the invention as claimed.

We claim:

1. In a cassette-load movie camera having a film and shutter drive motor and an exposure control system including a light-sensitive cell for automatically setting the camera exposure in response to the quantity of light incident upon the light-sensitive cell, and an electrical power source for the drive motor and the exposure control system, a camera control system for adjusting the exposure control system to the sensitivity of the film contained in the cassette and for controlling the energization of the exposure control system in relation to energization of the drive motor comprising:

variable neutral density filter means positioned in optical alignment with said light-sensitive cell for selectively altering the quantity of light incident upon said cell;

filter setting means responsive to indicia provided on the film cassette to effect a particular neutral density setting for said variable neutral density filter means related to the sensitivity of the film in said film cassette;

sensitivity range control means for adjusting said exposure control system alternatively for a range of high film sensitivities or a range of low film sensitivities;

range setting means responsive to other indicia provided on the film cassette to effect setting of said range control means to either said high film-sensitivity range of said low film-sensitivity range as related to the sensitivity of the film contained in said film cassette, said filter setting means and said range setting means being correlated to effect adjustment of said exposure control system to the particular sensitivity of the film contained in said film cassette;

a camera control grip including a master control switch means normally biased to an open condition and adapted in closed condition to connect said exposure control system to said power source and a motor control switch means normally biased to an open condition and adapted in closed condition to connect said power source to said drive means, said master control switch means and said motor control switch means being arranged so that normal manual grasping of said grip closes said master control switch means before said motor switch means can be closed so that said exposure control system is energized before energization of said drive motor; and an electrical circuit arranged to connect said power source to said drive motor and said exposure control system and effective to render said motor control switch inoperative to energize said drive motor until said master control switch means is closed.

2. The invention defined in claim 1 wherein said sensitivity range control means comprises:

a resistance network for establishing a reference level for said light-sensitive cell; and switch means responsive to said range setting means for switching said resistance network alternatively between a first reference level setting for a high film sensitivity range and a second reference level for a low film sensitivity range.

3. The invention defined in claim 1 wherein said master control switch comprises an elongate lever positioned along one side of said grip and said motor control switch comprises a trigger positioned on the opposite side of said grip, with said switches arranged so that the normal grasping of said grip causes the closing of said master switch to precede the activation of said motor switch.

4. The invention defined in claim 3 wherein said master switch lever is positioned along the rearward side of said grip and biased outwardly from said grip and said motor switch trigger is positioned along the front side of said grip and biased outwardly from said grip, whereby the master switch lever is activated by the palm of the hand of the camera user before the motor switch trigger can conveniently be actuated by a finger of the user.

5. The invention defined in claim 4 wherein said motor control switch means includes a shutter release means movable by the activation of said motor control switch trigger between a first position locking said shutter means and a second position releasing said shutter means for operation, said motor control switch means being arranged to be opened and closed by the movement of said shutter release means into said first and second positions, respectively.

6. In a cassette-load movie camera having a film and shutter drive motor and an exposure control system including a photo-resistive cell for automatically setting the camera exposure aperture in response to the quantity of light incident upon the light-sensitive cell, and an electrical power source for the drive motor and the exposure control system, a camera control system for adjusting the exposure control system to the sensitivity of the film contained in the cassette and for controlling the energization of the exposure control system in relation to energization of the drive motor comprising:

a variable neutral density filter positioned for optical alignment with said photo-resistive cell and having a plurality of sections of differing neutral density to enable selective altering of the quantity of light incident upon said photo-resistive cell;

filter setting means responsive to indicia provided on the film cassette to effect the positioning of a selected one of said plurality of filter sections into optical alignment with said photo-resistive cell to establish a particular setting of said neutral density filter related to the sensitivity of the film in said film cassette;

sensitivity range control means for adjusting said exposure control system alternatively for a range of high film sensitivities or a range of low film sensitivities, said sensitivity range control means including a resistance network adapted to present in series with said photo-resistive cell a relatively large resistance or alternatively a relatively small resistance and switching means for switching said resistance network between said relatively large resistance condition to adjust said exposure control system for said range of high film sensitivities and said relatively low resistance condition to adjust said exposure control system for said range of low film sensitivities;

range setting means responsive to other indicia provided on the film cassette to effect setting of said switch means to either said range of high film sensitivities or said range of low film sensitivities as related to the sensitivity of the film contained in the film cassette, said filter setting means and said range setting means being correlated to effect adjustment of said exposure control system to the particular sensitivity of the film contained in said film cassette;

a camera control grip including a master control switch means normally biased to an open condition and adapted in closed condition to connect said exposure control system to said power source and a motor control switch means normally biased to an open condition and adapted in closed condition to connect said power source to said drive motor, said master control switch means and said motor control switch means being arranged so that normal manual grasping of said grip closes said master control switch means before said motor control switch means can be closed so that said exposure control system is energized before energization of said drive motor; and an electrical circuit arranged to connect said power source to said drive motor and said exposure control system and effective to render said motor control switch inoperative to energize said drive motor until said master control switch means is closed.

7. The invention defined in claim 6 wherein said master control switch comprises an elongated lever positioned along one side of said grip and said motor control switch comprises a trigger positioned on the opposite side of said grip, with said switches arranged so that the normal grasping of said grip causes the closing of said master switch to precede the activation of said motor switch.

8. The invention defined in claim 7 wherein said master switch lever is positioned along the rearward side of said grip and biased outwardly from said grip and said motor switch trigger is positioned along the front side of said grip and biased outwardly from said grip, whereby the master switch lever is activated by the palm of the hand of the camera user before the motor switch trigger can conveniently be actuated by a finger of the user.

9. The invention defined in claim 8 wherein said motor control switch means includes a shutter release means movable by the activation of said motor control switch trigger between a first position locking said shutter means and a second position releasing said shutter means for operation, said motor control switch means being arranged to be opened and closed by the movement of said shutter release means into said first and second positions, respectively.

10. In a cassette-load movie camera having a film and shutter drive motor and an exposure control system including a light-sensitive cell for automatically setting the camera exposure aperture in response to the quantity of light incident upon the light-sensitive cell and an electrical power source for the drive motor and the exposure control system, a camera control system for adjusting the exposure control system to the sensitivity of the film contained in the cassette and for controlling the energization of the exposure control system in relation to energization of the drive motor comprising:

variable density filter means having a plurality of density settings and positioned in optical alignment with said light-sensitive cell for selectively altering the quantity of light-incident upon said cell;

filter setting means responsive to indicia provided on the film cassette to effect a particular density setting for said variable density filter means that is related to the sensitivity of the film in said film cassette;

sensitivity range control means for adjusting said exposure control system for any one of a plurality of ranges of film sensitivities;

range setting means responsive to other indicia provided on the film cassette to effect a setting of said range control means to a selected one of said plurality of ranges of film sensitivities that is related to the sensitivity of the film contained in said film cassette, said filter setting means and said range setting means being correlated to effect adjustment of said exposure control system to the particular sensitivity of the film in said film cassette within a broad sensitivity range by providing said plurality of density settings of said filter means in each of said plurality of ranges of film sensitivities;

a camera control grip including a master control switch means normally biased to an open condition and adapted in closed condition to connect said power source to said exposure control system and a motor control switch means normally biased in an open condition and adapted in a closed condition to connect said power source to said drive motor, said master control switch means and said motor control switch means being arranged so that normal manual grasping of said grip closes said master control switch means before said motor control switch means can be closed so that said exposure control system is energized before energization of said drive motor; and an electrical circuit arranged to connect said power source to said drive motor and to said exposure control system and effective to render said motor control switch inoperative to energize said drive motor until said master control switch means is closed.

11. The invention defined in claim 10 wherein said sensitivity range control means comprises:

a resistance network for setting a reference level for said photo resistive cell; and network switch means responsive to said range setting means for switching said resistance network selectively to any one of a plurality of ranges of film sensitivities.

\* \* \* \* \*